April 4, 1939. W. M. BAUMHECKEL 2,152,727
WATER PUMP AND SEAL THEREFOR
Filed June 8, 1936
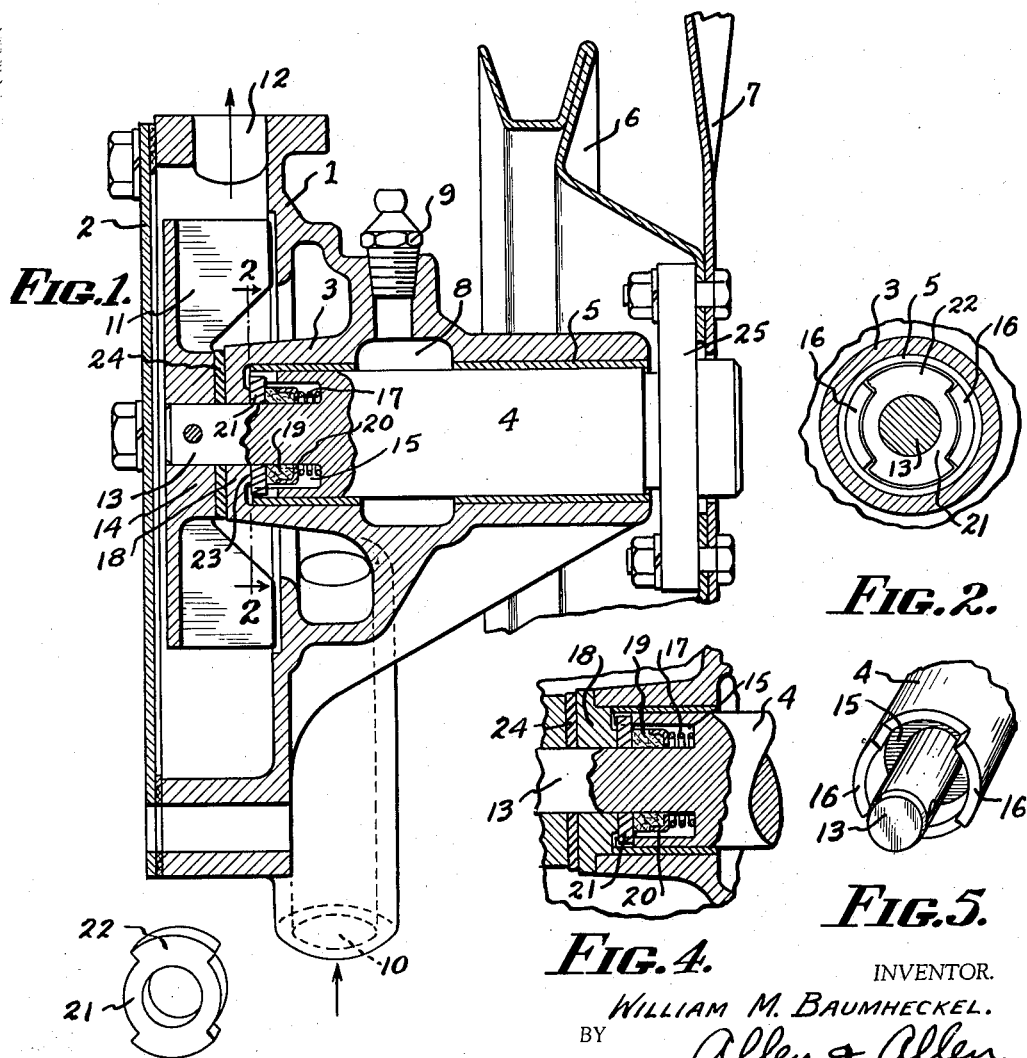
INVENTOR.
WILLIAM M. BAUMHECKEL.
BY Allen & Allen
ATTORNEYS.

Patented Apr. 4, 1939

2,152,727

UNITED STATES PATENT OFFICE 2,152,727

WATER PUMP AND SEAL THEREFOR

William M. Baumheckel, Cincinnati, Ohio, assignor to B. B. B. Corporation, Detroit, Mich., a corporation of Michigan Application June 8, 1936, Serial No. 84,134

5 Claims. (Cl. 308—36.2)

My invention relates to sealing arrangements for water pumps in which a large diameter shaft is employed, thrust of the impeller taken care of, without calling upon the seal, and in which the seal is located outside of the pump casing itself.

This arrangement permits of the use of the seal in a small size, the larger rigidity and greater bearing surface of the pump shaft, and the adequate protection against the thrust forces in the pump, which are particularly difficult to handle in that type of pump where the motor fan is attached to the same shaft as the pump impeller, as in motor vehicle use.

Another advantage of my invention is ease of assembly of the device, since the seal, in the preferred form can be assembled with the shaft, the shaft thrust through its journal and into the impeller casing, the thrust washer for the shaft set over its inwardly projecting end, and the impeller then pressed onto the end of the shaft, whereupon the balance of the pump casing is bolted into place.

In the following specification I will describe several modifications of my device, and in the claims that follow, I will set forth the patentable novelty inherent in the example particularly described, as well as modifications thereof falling within the stated novel subject matter.

In the drawing:

Fig. 1 is a vertical section taken through a motor vehicle water pump and fan combination illustrating my invention.

Fig. 2 is a section on the line 2—2 of Fig. 1.

Fig. 3 is a perspective of the seal washer.

Fig. 4 is a detail section of the seal and thrust devices with the journal end wall pressed in, not integral.

Fig. 5 is a detail perspective of the inner end of the pump shaft.

Fig. 6 is a section showing a modification of the device as illustrated in Fig. 4 in which a separate housing is used for the seal instead of forming the housing in the shaft itself.

Fig. 7 is a perspective of this housing.

Fig. 8 is a perspective of the shaft end as used in this modification.

Referring first to Fig. 1, I have shown an impeller casing 1 having a closing plate 2, and a shaft journal 3 integral with the main part of the impeller casing.

The shaft 4, which may or may not be provided with a bearing sleeve 5, is journaled in the portion 3 of the casing, and at its outer end has bolted thereto the driving pulley 6, and the motor fan 7. The journal 3 has an oil channel 8 therein, into which oil is placed from a plugged hole 9.

Water enters the pump casing at 10 and under influence of the impeller 11, is caused to pass out of the casing at 12. The thrust on the system both from the impeller operation and the fan operation is to the right in Fig. 1.

The shaft, as will be noted, is of large diameter, which is a great advantage both in bearing surface and rigidity, permitting long life of the device in use. Its outer end as at 13 is smaller and adapted to be thrust into the impeller hub 14. Back of this end the shaft is machined out to provide an annular chamber 15, the walls of which terminate in spaced lugs 16. Into this chamber the seal is placed.

This seal is formed according to my Patent No. 1,889,397 the shaft itself providing the housing therefor. It consists of a spring 17 of any desired type, which forces the seal toward the casing wall 18 in which the shaft journal terminates. About the narrowed shaft end is placed a ring of packing material 19, which is preferably held together by a metal ring 20, against which ring the spring thrust is applied. Then there is a washer 21 of some hard, tough material, preferably Bakelite or some condensation product, with or without graphite in it. This washer has lugs 22 thereon, which lie between the lugs 16 of the shaft chamber in which the rest of the seal lies.

As so constructed the packing is driven by the shaft, and is pressed by the spring against the washer 21, which washer in turn bears against a shoulder 23 in the inner end of the shaft journal.

Where the shaft passes through into the pump casing, a thrust washer 24, preferably of like material to the washer 21 is placed over the shaft, and has a wide bearing against the inner face of the casing about the hole through which the shaft extends. Not being made commensurate with the seal the thrust area on this washer can be made of very ample size to take the thrust load.

Upon assembly the seal is set in place on the shaft in the manner shown, with the fan and pulley also in place, if desired. The shaft is then thrust through the long journal, with its narrow end passing into the pump casing proper. Over this end is placed the thrust washer and then the impeller is pressed on the shaft end, until the face of its hub lines up with the inner end of the shaft. The impeller may be pinned in this position if desired.

Once assembled in this fashion, the end plate of the pump casing is bolted in place and the pump is finished. In operation the seal does not wear greatly so far as the packing is concerned because the packing moves around with the shaft. Water cannot leak out of the pump casing because the washer 21 prevents, by its bearing on the shoulder 23, any leakage around it. The packing is forced by the spring against the washer preventing any leakage around the inner side of the washer, and the packing hugs the shaft preventing any leakage along the shaft.

It will be noted that the flange 25 to which the fan and pulley are mounted is cast integral with the shaft, and can readily be machined along with the shaft. This secures against any run out on the part of the fan and pulley, and the balance of the rotating mass once set up remains the same, thus saving wear on the apparatus.

The modification which I have shown in Figs. 6, 7, and 8, eliminates the chamber formed in the shaft for the seal. To this end a separate housing piece 30 is provided having spaced lugs 31 and spaced lugs 32. The lugs 32 engage in flats 32a cut in the thick portion of the shaft where the narrow portion begins. The lugs 31 engage the washer 21, which is the same as in the first instance. The spring for the seal bears against the shoulder formed in cutting down the thickness of the shaft, and the packing lies inside of the housing piece 30. The operation is the same, and merely eliminates machining out the chamber in the shaft.

Having thus described my invention, what I claim as new and desire to secure by Letters Patent, is:

1. A shaft and seal assembly for use in water pumps having a casing and a shaft journal opening into the casing, comprising a shaft of a size to fit the said journal and reduced in thickness where it enters the casing, and a seal set over the shaft having a spring seated on the shoulder produced in reducing the thickness of the shaft, a packing and a washer, said seal arranged so that the washer engages the journal about the opening into the casing.

2. A shaft and seal assembly for use in water pumps having a casing and a shaft journal opening into the casing, comprising a shaft of a size to fit the said journal and reduced in thickness where it enters the casing, and a seal set over the shaft having a spring seated on the shoulder produced in reducing the thickness of the shaft, a packing and a washer, said seal arranged so that the washer engages the journal about the opening into the casing, and a thrust washer on said shaft arranged to engage the casing about the journal opening into the same.

3. In combination with a pump casing having an elongated shaft journal opening into the casing, a shaft having a reduced end passing from the journal into the casing, the larger body of the shaft provided with an annular recess therein, and a seal seated in said recess and including a washer to bear about the opening between the journal and the casing.

4. In combination with a pump casing having an elongated shaft journal opening into the casing, a shaft having a reduced end passing from the journal into the casing, the larger body of the shaft provided with an annular recess therein, and a seal seated in said recess and including a washer to bear about the opening between the journal and the casing, the outer wall of the shaft recess being provided with lugs, and the washer having lugs to engage between them, whereby the washer is driven with the shaft.

5. A shaft and seal assembly for use in water pumps having a casing and a shaft journal opening into the casing, comprising a shaft of a size to fit the said journal and reduced in thickness where it enters the casing, and a seal set over the shaft within the journal and having a spring seated on the shoulder produced in reducing the thickness of the shaft, a packing and a washer, said seal arranged so that the washer engages the journal about the opening into the casing, and a housing for the seal driven with the shaft and engaging the washer.

WILLIAM M. BAUMHECKEL.